US006548724B2

(12) United States Patent
Bagheri et al.

(10) Patent No.: US 6,548,724 B2
(45) Date of Patent: *Apr. 15, 2003

(54) OLIGOMER OILS AND THEIR MANUFACTURE

(75) Inventors: Vahid Bagheri, Winfield, IL (US); David C. Eisenberg, Northbrook, IL (US); Kevin S. Ratliff, Naperville, IL (US); Ranier Benda, Brussels (BE); Carroll W. Lanier, Baton Rouge, LA (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,501

(22) Filed: Mar. 22, 2001

(65) Prior Publication Data

US 2001/0041818 A1 Nov. 15, 2001

Related U.S. Application Data

(63) Continuation-in-part of application No. 09/401,867, filed on Sep. 23, 1999.

(51) Int. Cl.⁷ ................. C07C 2/06; C07C 2/02

(52) U.S. Cl. .............. 585/517; 585/521; 585/523; 585/524

(58) Field of Search ................ 585/517, 521, 585/523, 524

(56) References Cited

U.S. PATENT DOCUMENTS 5,688,887 A * 11/1997 Bagheri et al. ............. 525/910
5,929,297 A *  7/1999 Theriot et al. ............. 585/510

FOREIGN PATENT DOCUMENTS

| WO | WO 96/23010 | * | 8/1986 |
| WO | WO 99/12981 | * | 3/1999 |

* cited by examiner

*Primary Examiner*—Walter D. Griffin
*Assistant Examiner*—Tam M. Nguyen
(74) *Attorney, Agent, or Firm*—James R. Henes

(57) ABSTRACT

A multistep process for the selective production of an oligomer oil having predetermined properties in which the first step involves the polymerization of a feedstock containing one or more $C_3$ to $C_{20}$ 1-olefins in the presence of a catalyst comprising a bulky ligand transition metal catalyst and in which a subsequent step involves the olgiomerization of at least a preselected fraction of the product of the first step.

35 Claims, No Drawings

OLIGOMER OILS AND THEIR MANUFACTURE

RELATED APPLICATION

This application is a continuation-in-part application of copending U.S. patent application Ser. No. 09/401,867, filed on Sep. 23, 1999.

BACKGROUND OF THE INVENTION

1. Field of the Invention

The present invention relates generally to a multistep preparation of an oligomer oil, and relates more particularly to an aforesaid multistep preparation in which the first step involves the polymerization of a feedstock containing one or more $C_3$ to $C_{20}$ 1-olefins in the presence of a catalyst system comprising a bulky ligand transition metal catalyst and in which a subsequent step involves the oligomerization of at least a preselected fraction of the product of the first step.

2. Discussion of the Prior Art

Numerous processes have been disclosed for polymerizing or oligomerizing an ethylenically unsaturated olefin. For example, Rossi et al., PCT/US93/12102, published on Jun. 23, 1994 as WO 94/13715, discloses a catalyst system comprising a bulky ligand transition metal compound having a formula which is similar to Formula 1, 2, 3 or 4 herein below. The catalyst system also includes an activator compound containing a metal of Group II or III of the Periodic Table of the Elements, especially trialkyl aluminum compounds, alumoxanes both linear and cyclic, or ionizing ionic activators or compounds such as tri(n-butyl) ammonium tetra(pentafluorophenyl) boron. The disclosed process involves copolymerization of ethylene and an alpha-olefin. Suitable alpha-olefins have one hydrogen atom on the second carbon, at least two hydrogens on the third carbon or at least one hydrogen on the fourth carbon. The resulting copolymers produced contain a high degree of terminal ethenylidene or vinylidene unsaturation, and have a number average molecular weight of 300 to 15,000 and a molecular weight distribution ($M_w/M_n$) of typically less than 5.

Bagheri et al., U.S. Pat. No. 5,688,887 discloses another such process for polymerizing a feedstock containing one or more $C_3$ to $C_{20}$ 1-olefins and a second hydrocarbon which is not a 1-olefin, to form a highly reactive, low molecular weight, viscous, essentially 1-olefin-containing poly(1-olefin) or copoly(1-olefin) in the presence of a metallocene catalyst comprising a cyclopentadienyl or indenyl Periodic Group IVb metallocene catalyst and aluminoxane cocatalyst. The resulting polymer product has a terminal vinylidene content of more than 80%, is highly reactive and has a molecular weight between 300 and 10,000. Bagheri et al. also discloses reactions of the poly(1-olefin) or copoly (1-olefin) product in which the terminal vinylidene linkage is reacted with an aromatic, an epoxidation agent, a silylation agent, maleic anhydride, carbon monoxide and hydrogen, halogen and hydrohalogen.

Johnson et al., PCT/US96/01282, published on Aug. 1, 1996 as WO 96/23010, discloses processes that employ a catalyst system comprising a different type of bulky ligand transition metal compound that has a formula which corresponds closely to Formulas 5, 6, 7 or 8 herein below. The disclosed processes involve the use of the aforesaid catalyst for the polymerization of ethylene, acyclic olefins, and/or selected cyclic olefins and optionally selected olefinic esters or carboxylic acids, and other monomers to produce a wide variety of homopolymers and copolymers.

Furthermore, there have been a number of patent publications that disclose a catalyst system that comprises a bulky ligand transition metal compound having a stoichiometric formula that is similar to that of Formula 9 or 10 hereinbelow and an activating amount of an activator selected from organoaluminum compounds and hydrocarbylboron compounds. For example, Britovsek et al., PCT/GB98/02638, published on Mar. 18, 1999 as WO 99/12981, discloses such a catalyst system for use in the polymerization of 1-olefins. Brookhart et al., PCT/US98/00316, published on Jul. 16, 1998 as WO 98/30612, discloses a similar catalyst system for use in the polymerization of propylene. Brookhart et al., PCT/US98/14306, published on Jan. 21, 1999 as WO 99/02472, discloses a process for producing alpha-olefins by reacting ethylene in the presence of a similar catalyst system and discloses that the alpha-olefins produced can be further homopolymerized or copolymerized with other olefins to form polyolefins or can be converted to alcohols. Bennett, PCT/US97/23556, published on Jun. 25, 1998 as WO 98/27124, discloses a process for polymerizing ethylene in the presence of a similar catalyst system. Vaughn et al., PCT/US97/10418, published on Dec. 24, 1997 as WO 97/48736, discloses a process for heterogeneously polymerizing an olefin monomer in the presence of a similar catalyst system comprising a bulky ligand transition metal compound immobilized on a support material. Matsunaga et al., PCT/US97/10419, published on Dec. 24, 1997 as WO 97/48737, discloses a process for homopolymerizing or copolymerizing ethylene in the presence of such a catalyst system at elevated ethylene pressures.

A major problem associated with making oligomer oils from vinyl olefins is that the oligomer product mix usually must be fractionated into different portions to obtain oils of a given desired viscosity (e.g., 2, 4, 6 or 8 cSt at 100° C.). As a result, in commercial production it is difficult to obtain an oligomer product mix which, when fractionated, will produce the relative amounts of each viscosity product which correspond to market demand, and it is often necessary to produce an excess of one product in order to obtain the needed amount of the other. Another problem is the lack of control over the chemistry, and isomerization of alpha olefins to internal olefins. A third problem is that polymerization processes often yield a high percentage of dimer, which is unsuitable (too volatile) for use as a lubricant. Therefore, it is highly desirable to develop a process that provides the versatility of allowing the viscosity of the product to be tailored with improved selectivity and product oils having a pre-selected desired viscosity to be manufactured reproducibly and easily.

Schaerf et al., U.S. Pat. Nos. 5,284,988 and 5,498,815 disclose two two-step processes for preparing a synthetic oil that do provide improved versatility of allowing one to tailor the viscosity of the synthetic oil product with improved selectivity. U.S. Pat. No. 5,284,988 discloses a process which provides improved selectivity when forming synthetic oils using as starting olefins, vinylidene olefins and alpha-olefins. The process of U.S. Pat. No. 5,284,988 for making a synthetic oil comprises (a) isomerizing at least a portion of a vinylidene olefin feed in the presence of an isomerization catalyst to form an intermediate which contains tri-substituted olefin and (b) codimerizing the intermediate and at least one vinyl olefin in the presence of an oligomerization catalyst to form a synthetic oil which comprises a co-dimer of the vinylidene olefin and the vinyl olefin. Suitable vinylidene olefins for use in the isomerization step of the process of U.S. Pat. No. 5,284,988 can be prepared using known methods such as by dimerizing vinyl olefins containing from 4 to about 30 carbon atoms, preferably at least 6, and most preferably at least 8 to about 20 carbon atoms, including mixtures thereof. Suitable vinyl olefins for use in the codimerization step of the process of U.S. Pat. No. 5,284,988 contain from 4 to about 30 carbon atoms, and, preferably about 6 to about 24 carbon atoms, including mixtures thereof. The codimerization step can use any suitable dimerization catalyst known in the art and especially Friedel-Crafts type catalysts such as acid halides (Lewis Acid) or proton acid (Bronsted Acid) catalysts, which can be used in combination and with promoters.

U.S. Pat. No. 5,498,815 discloses a process for making a synthetic oil which comprises the steps of reacting a vinylidene olefin in the presence of a catalyst to form an intermediate mixture which contains at least about 50 weight percent dimer of the vinylidene olefin, and thereafter adding a vinyl olefin to the intermediate mixture and reacting the intermediate mixture and the vinyl olefin in the presence of a catalyst so as to form a product mixture which contains the dimer of the vinylidene olefin and a co-dimer of the added vinyl olefin with the vinylidene olefin. Suitable vinylidene olefins for use in the first step of this process can be prepared using known methods, such as by dimerizing vinyl olefins containing from 4 to about 30 carbon atoms. Suitable vinyl olefins for use in the second step of this process contain from 4 to about 30 carbon atoms. Both steps can use any suitable dimerization catalyst known in the art and especially Friedel-Crafts type catalysts such as acid halides (Lewis Acid) or proton acid (Bronsted Acid) catalysts, which catalysts can be used in combination and with promoters.

Hobbs et al., PCT/US90/00863, published on Sep. 7, 1990 as WO 90/10050, discloses a method for improving the thermal stability of synthetic lubricants composed of alpha-olefin oligomers by alkylation thereof in the presence of an acid alkylation catalyst with an olefin such as decene or the lower molecular weight, non-lubricant range olefins produced in the course of the oligomerization of 1-alkenes. The alpha-olefin oligomers are obtained by oligomerization of $C_6$ to $C_{20}$ alpha-olefin feedstock in the presence of a reduced valence state Group VIB metal catalyst on a porous support and recovering from the resulting product mixture oligomers comprising olefinic lubricant range hydrocarbons.

However, neither U.S. Pat. No. 5,284,988, nor U.S. Pat. No. 5,498,815 nor PCT/US90/00863 discloses a multistep process that involves in the first step the polymerization of an olefin in the presence of a catalyst system comprising a bulky ligand transition metal complex to form a product mixture comprising a distribution of products at least a fraction of which have properties that are outside of a predetermined range therefor, and in a subsequent step the oligomerization of at least a pre-selected fraction of the product mixture formed in the first step.

OBJECTS OF THE INVENTION

It is therefore a general object of the present invention to provide an improved process for producing an oligomer oil having predetermined properties which overcomes the aforesaid problems of prior out methods.

More particularly, it is an object of the present invention to provide an improved aforesaid process that permits a greater degree of control over the chemistry and minimizes the degree of double bond-isomerization of the olefins in the feedstock.

It is a related object of the present invention to provide an improved aforesaid process which permits improved efficiency in the conversion of ethylenic olefins to oligomer oils having predetermined properties.

Other objects and advantages will become apparent upon reading the following detailed description and appended claims.

SUMMARY OF THE INVENTION

These objects are achieved by the process of the present invention for the selective production of an oligomer oil having predetermined properties comprising a first step (a) of polymerizing a feed comprising one or more $C_3$ to $C_{20}$ olefins having at least one hydrogen on the 2-carbon atom, at least two hydrogens on the 3-carbon atom and at least one hydrogen on the 4-carbon (if at least 4 carbon atoms are present in the olefin), in the presence of a catalyst system comprising a bulky ligand transition metal complex of the Formula 1 and an activating quantity of an activator comprising an organoaluminum compound or a hydrocarbylboron compound or a mixture thereof:

     Formula 1

In Formula 1, L is the bulky ligand, M is the transition metal, X and $X^1$ may be the same or different and are independently selected from the group consisting of halogen, hydrocarbyl group or hydrocarboxyl group having 1–20 carbon atoms, m is 1–3, n is 0–3, p is 0–3 and the sum of the integers m+n+p corresponds to the transition metal valency. A product mixture is formed that comprises a distribution of products at least a fraction of which have properties that are outside of a predetermined range therefor. In a subsequent step (b), at least a pre-selected fraction of the product formed in step (a) is oligomerized in the presence of an acidic oligomerization catalyst to thereby form the aforesaid oligomer oil. The resulting product mixture contains less than 35 weight percent of oligomers that contain two or less monomeric units and at least 60 weight percent of oligomers that contain three monomeric units.

DETAILED DESCRIPTION OF THE PREFERRED EMBODIMENTS

The catalyst system employed in step (a) of the method of this invention comprises a bulky ligand transition metal complex of the stoichiometric Formula 1:

     Formula 1 wherein L is the bulky ligand, M is the transition metal, X and $X^1$ are independently selected from the group consisting of halogen, hydrocarbyl group or hydrocarboxyl group having 1–20 carbon atoms, and m is 1–3, n is 0–3, p is 0–3, and the sum of the integers m+n+p corresponds to the transition metal valency. The aforesaid metal complex contains a multiplicity of bonded atoms forming a group which may be cyclic with one or more optional heteroatoms. The ligands L and X may be bridged to each other, and if two ligands L and/or X are present, they may be bridged.

In one preferred embodiment, the catalyst is a metallocene, M is a Group IV, V or VI transition metal, and one or more L is a cyclopentadienyl or indenyl moiety. In this embodiment, the feed comprises one or more linear $C_3$ to $C_{20}$ 1-olefins, preferably one or more linear $C_4$ to $C_{20}$ 1-olefins, and the product mixture formed in step (a) comprises an essentially terminally unsaturated viscous, essentially 1-olefin-containing poly(1-olefin) or copoly(1-olefin) of molecular weight between 300 and 10,000 that exhibits a terminal vinylidene content of more than 50%, preferably more than 80%. Preferably, the metallocene is represented by the stoichiometric Formula 2:

$$(Cp)_m MR^1{}_n R^2{}_p \qquad \text{Formula 2}$$

wherein each Cp is a substituted or unsubstituted cyclopentadienyl or indenyl ring, and each such substituent thereon can be the same or different and is an alkyl, alkenyl, aryl, alkaryl, or aralkyl radical having from 1 to 20 carbon atoms or at least two carbon atoms formed together to form a part of a $C_4$ or $C_6$ ring; wherein $R^1$ and $R^2$ are independently selected from the group consisting of halogen, hydrocarbyl, hydrocarboxyl, each having 1–20 carbon atoms; and wherein m is 1–3, n is 0–3, p is 0–3, and the sum of m+n+p corresponds to the oxidation state of M.

In alternative preferred embodiments, the metallocene is represented by the stoichiometric Formulas 3 or 4:

$$(C_5 R^3{}_g)_k R^4{}_s (C_5 R^3{}_g) MQ_{3-k-x} \qquad \text{Formula 3}$$

or $$R^4{}_s (C_5 R^3{}_g)_2 MQ^1 \qquad \text{Formula 4}$$

wherein each $C_5 R^3{}_g$ is a substituted or unsubstituted cyclopentadienyl, wherein each $R^3$ may be the same or different and is hydrogen, alkyl, alkenyl, alkaryl or aralkyl having from 1 to 20 carbon atoms or at least 2 carbon atoms joined together to form a part of a $C_4$ to $C_6$ ring; wherein $R^4$ is either 1) an alkylene radical containing from 1 to 4 carbon atoms, or 2) a dialkyl germanium or silicon or an alkyl phosphoric or amine radical, and $R^4$ is substituting on and bridging two $C_5 R^3{}_g$ rings or bridging one $C_5 R^3{}_g$ ring back to M, wherein each Q can be the same or different and is an alkyl, alkenyl, aryl, alkaryl, or arylalkyl radical having from 1 to 20 carbon atoms or halogen, and Q' is an alkylidene radical having from 1 to 20 carbon atoms; when k is 0, x is 1 otherwise x is always 0; and wherein s is 0 or 1; and when s is 0, g is 5 and k is 0, 1 or 2; and when s is 1, g is 4 and k is 1. M is a transition metal of Group IV, V or VI, preferably Group IV.

Preferably each $C_5 R^3{}_g$ is a monosubstituted cyclopentadienyl of the type $C_5 H_4 R^3$ and each $R^3$ may be the same or different and is a primary or secondary alkyl radical. When $R^3$ is a primary alkyl, it is preferable methyl, ethyl or n-butyl. When $R^3$ is a secondary radical, it is preferably isopropyl or sec-butyl. The resulting product has a viscosity in the range of 2 to 20 cSt at 100° C. In another preferred embodiment, each $C_5 R^3{}_g$ is a di-, tri- or tetrasubstituted cyclopentadienyl of the type $C_5 H_3 R^3{}_2$, $C_5 H_2 R^3{}_3$ or $C_5 H R^3{}_4$, and each $R^3$ may be the same or different and primary or secondary radical. The resulting product has a viscosity in the range of 20 to 5000 cSt at 100° C. In both cases the reaction is performed at a temperature in the range of from about 25 to about 150° C.

In another preferred embodiment, the catalyst, instead of being a metallocene, is a complex of stoichiometric Formula 5, 6, 7 or 8 having a bidentate ligand:

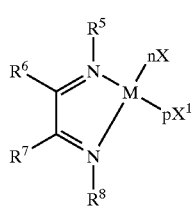

Formula 5

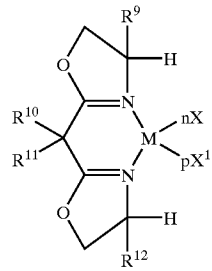

Formula 6

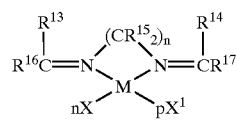

Formula 7 or

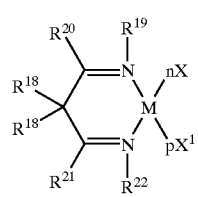

Formula 8

In Formulas 5–8, the transition metal M is selected from the group consisting of Ti, Zr, Sc, V, Cr, a rare earth metal, Fe, Co, Ni, or Pd; X and $X^1$ are independently selected from the group consisting of halogen, hydrocarbyl group, and hydrocarboxyl group having 1 to 20 carbon atoms; n and p are integers whose sum is the valency of M minus 2 (the number of bonds between M and the bidentate ligand), $R^5$ and $R^8$ are each independently hydrocarbyl or substituted hydrocarbyl, provided that the carbon atom bound to the imino nitrogen atom has at least two carbon atoms bound to it; $R^6$ and $R^7$ are each independently hydrogen, hydrocarbyl, substituted hydrocarbyl, or $R^6$ and $R^7$ taken together are hydrocarbylene or substituted hydrocarbylene to form a carbocyclic ring; $R^9$ and $R^{12}$ are each independently hydrogen, hydrocarbyl or substituted hydrocarbyl; $R^{10}$ and $R^{11}$ are each independently hydrogen, hydrocarbyl or substituted hydrocarbyl; each $R^{15}$ is independently hydrogen, hydrocarbyl or substituted hydrocarbyl, or two of $R^{15}$ taken together form a ring; $R^{16}$ is hydrocarbyl or substituted hydrocarbyl, and $R^{13}$ is hydrogen, hydrocarbyl or substituted hydrocarbyl or $R^{16}$ and $R^3$ taken together form a ring; $R^{17}$ is hydrocarbyl or substituted hydrocarbyl, and $R^{14}$ is hydrogen, hydrocarbyl or substituted hydrocarbyl, or $R^{17}$ and $R^{14}$ taken together form a ring; each $R^{18}$ is independently hydrogen, hydrocarbyl or substituted hydrocarbyl; $R^9$ and $R^{22}$ are each independently hydrocarbyl or substituted hydrocarbyl, provided that the carbon atom bound to the imino nitrogen atom has at least two carbon atoms bound to it; $R^{20}$ and $R^{21}$ are each independently hydrogen, hydrocarbyl or substituted hydrocarbyl; each $R^{23}$ is independently hydrocarbyl or substituted hydrocarbyl provided that any olefinic bond in said olefin is separated from any other olefinic bond or aromatic ring by a quaternary carbon atom or at least two saturated carbon atoms. When M is Pd, a diene is not present, and when a complex of Formula 7 is employed, M is not Pd. M is preferably Co, Fe, Ni or Pd; and is more preferably Ni or Pd. In Formula 7, n is 2 or 3.

In another preferred embodiment, instead of being a metallocene or a complex involving a bidentate ligand, the aforesaid bulky ligand transition metal complex is a complex of stoichiometric Formula 9:

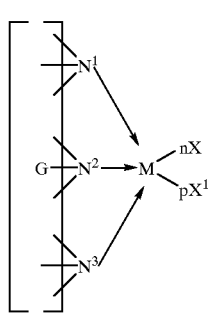

Formula 9 wherein three nitrogen atoms $N^1$, $N^2$ and $N^3$, are coordinately bonded to transition metal M selected from Co, Fe, Ru and Mn; wherein G comprises one or more organic moieties to which the three nitrogen atoms $N^1$, $N^2$ and $N^3$ are collectively or separately bonded; wherein X and $X^1$ are independently selected from the group consisting of halogen, hydrocarbyl group and hydrocarboxyl group having 1 to 20 carbon atoms; wherein n and p are integers whose sum is the valency of M minus 3 (the number of bonds between M and the tridentate ligand); and wherein when M is Co, the sum of the integers n and p is 1, 2, or 3, when M is Ru, the sum of n and p is 2, 3, or 4, when M is Fe, the sum of n and p is 2 or 3, and when M is Mn, the sum of n and p is 1, 2, 3 or 4.

In a highly preferred embodiment of the complex of Formula 9, the aforesaid metal complex has the structure of Formula 10:

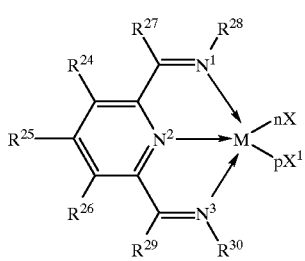

Formula 10 wherein M is Fe[II], Fe[III], Co[I], Co[II], Co[III], Ru[II], Ru[IV], Mn[I], Mn[II], Mn[III] or Mn[IV]; wherein X and $X^1$ are independently selected from the group consisting of halogen, hydrocarbyl group and hydrocarboxyl group having 1 to 20 carbon atoms; wherein n and p are integers whose sum is the valency of M; wherein $R^{24}$, $R^{25}$, $R^{26}$, $R^{27}$, and $R^{29}$ are independently selected from hydrogen, halogen, hydrocarbyl, substituted hydrocarbyl, heterohydrocarbyl or substituted heterohydrocarbyl, and wherein (1) when M is Fe, Co or Ru, $R^{28}$ and $R^{30}$ are independently selected from hydrogen, halogen, hydrocarbyl, substituted hydrocarbyl, heterohydrocarbyl or substituted heterohydrocarbyl; and when any two or more of $R^{24}$–$R^{30}$ are hydrocarbyl, substituted hydrocarbyl, heterohydrocarbyl or substituted heterohydrocarbyl, said two or more can be linked to form one or more cyclic substituents, or (2) when M is Fe, Co, Mn or Ru, then $R^{28}$ is represented by the stoichiometric Formula 11, and $R^{30}$ is represented by the stoichiometric Formula 12 as follows:

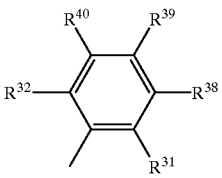

Formula 11

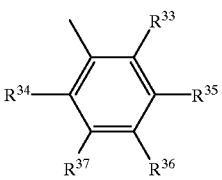

Formula 12 wherein $R^{31}$ to $R^{40}$ are independently selected from hydrogen, halogen, hydrocarbyl, substituted hydrocarbyl, heterohydrocarbyl or substituted heterohydrocarbyl; and wherein when any two or more of $R^{24}$ to $R^{27}$, $R^{29}$ and $R^{31}$ to $R^{40}$ are hydrocarbyl, substituted hydrocarbyl, heterohydrocarbyl or substituted heterohydrocarbyl, said two or more can be linked to form one or more cyclic substituents; with the proviso that at least one of $R^{31}$, $R^{32}$, $R^{33}$ and $R^{34}$ is hydrocarbyl, substituted hydrocarbyl, heterohydrocarbyl or substituted heterohydrocarbyl when neither of the ring systems of Formulas 11 or 12 forms part of a polyaromatic fused-ring system, or (3) when M is Fe, Co, Mn or Ru, then $R^{28}$ is a group having the formula $—NR^{41}R^{42}$ and $R^{30}$ is a group having the formula $—NR^{43}R^{44}$, wherein $R^{41}$ to $R^{44}$ are independently selected from hydrogen, halogen, hydrocarbyl, substituted hydrocarbyl, heterohydrocarbyl or substituted heterohydrocarbyl; and wherein when any two or more of $R^{24}$ to $R^{27}$, $R^{29}$ and $R^{41}$ to $R^{44}$ are hydrocarbyl, substituted hydrocarbyl, heterohydrocarbyl or substituted heterohydrocarbyl, such two or more can be linked to form one or more cyclic substituents.

In addition to the bulky ligand transition metal complex, the catalyst system employed in step (a) of the method of this invention also contains an activating quantity of an activator selected from organoaluminum compounds and hydrocarbylboron compounds. Such organoaluminum compounds include fluoro-organoaluminum compounds. Suitable organoaluminum compounds include compounds of the formula $AlR^{50}_3$, where each $R^{50}$ is independently $C_1$–$C_{12}$ alkyl or halo. Examples include trimethylaluminium (TMA), triethylaluminium (TEA), tri-isobutylaluminium (TIBA), tri-n-octylaluminium, methylaluminiumdichloride, ethylaluminium dichloride, dimethylaluminium chloride, diethylaluminium chloride, ethylaluminumsesquichloride, methylaluminumsesquichloride, and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear and cyclic compounds. The cyclic alumoxanes can be represented by the formula $[R^{51}AlO]_s$ and the linear alumoxanes by the formula $R^{52}(R^{53}AlO)_s$ wherein s is a number from about 2 to 50, and wherein $R^{51}$, $R^{52}$, and $R^{53}$ represent hydrocarbyl groups, preferably $C_1$ to $C_6$ alkyl groups, for example methyl, ethyl or butyl groups. Alkylalumoxanes such as linear or cyclic methylalumoxanes (MAOs) or mixtures thereof are preferred.

Mixtures of alkylalumoxanes and trialkylaluminium compounds are particularly preferred, such as MAO with TMA or TIBA. In this context it should be noted that the term "alkylalumoxane" as used in this specification includes alkylalumoxanes available commercially which may contain a proportion, typically about 10 weight percent, but optionally up to 50 weight percent, of the corresponding trialkylaluminium, for instance, commercial MAO usually contains approximately 10 weight percent trimethylaluminium (TMA), while commercial MMAO contains both TMA and TIBA. Quantities of alkylalumoxane quoted herein include such trialkylaluminium impurities, and accordingly quantities of trialkylaluminium compounds quoted herein are considered to comprise compounds of the formula $AlR_3$ additional to any $AlR_3$ compound incorporated within the alkylalumoxane when present.

Examples of suitable hydrocarbylboron compounds are boroxines, trimethylboron, triethylboron, dimethylphenylammoniumtetra(phenyl)borate, trityltetra(phenyl)borate, triphenylboron, dimethylphenylammonium, tetra(pentafluorophenyl)borate, sodium tetrakis[(bis-3,5-trifluoromethyl)phenyl]borate, trityltetra(pentafluorophenyl)borate and tris(pentafluorophenyl)boron.

In the preparation of the catalysts of the present invention, the quantity of activating compound selected from organoaluminium compounds and hydrocarbylboron compounds to be employed is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms, of aluminum or boron per atom of the transition metal in the compound of Formula 1. Generally, from about 1 mole to about 5000 moles, preferably to about 150 moles of activator are employed per mole of transition metal complex.

When the catalyst system employed in step (a) of the method of this invention comprises a complex of Formulas 5–12, the catalyst preferably comprises a neutral Lewis Base in addition to the bulky ligand transition metal complex and the activator. Neutral Lewis bases are well known in the art of Ziegler-Natta catalyst polymerisation technology. Examples of classes of neutral Lewis bases suitably employed in the present invention are unsaturated hydrocarbons, for example, alkenes (other than 1-olefins) or alkynes, primary, secondary and tertiary amines, amides, phosphoramides, phosphines, phosphites, ethers, thioethers, nitriles, carbonyl compounds, for example, esters, ketones, aldehydes, carbon monoxide and carbon dioxide, sulphoxides, sulphones and boroxines. Although 1-olefins are capable of acting as neutral Lewis bases, for the purposes of the present invention they are regarded as monomer or comonomer 1-olefins and not as neutral Lewis bases per se. However, alkenes which are internal olefins, for example, 2-butene and cyclohexene are regarded as neutral Lewis bases in the present invention. Preferred Lewis bases are tertiary amines and aromatic esters, for example, dimethylaniline, diethylaniline, tributylamine, ethylbenzoate and benzylbenzoate. In this particular embodiment of the present invention, the transition metal complex (first component), activator (second component), and neutral Lewis base (third component) of the catalyst system can be brought together simultaneously or in any desired order. However, if the aforesaid second and third are compounds which interact together strongly, for example, form a stable compound together, it is preferred to bring together either the aforesaid first and second components or aforesaid first and third components in an initial step before introducing the final defined component. Preferably, the first and third components are contacted together before the second component is introduced. The quantities of first and second components employed in the preparation of this catalyst system are suitably as described above in relation to the catalysts of the present invention. The quantity of the neutral Lewis Base (component 3) is preferably such as to provide a ratio of the neutral Lewis Base to the first component of 100:1 to 1:1000, most preferably in the range 10:1 to 1:20. All three components of the catalyst system can be brought together, for example, as the neat materials, as a suspension or solution of the materials in a suitable diluent or solvent (for example a liquid hydrocarbon), or, if at least one of the components is volatile, by utilising the vapour of that component. The components can be brought together at any desired temperature. Mixing the components together at room temperature is generally satisfactory. Heating to higher temperatures, for example, up to 120° C., can be carried out if desired, for example, to achieve better mixing of the components. It is preferred to carry out the bringing together of the three components in an inert atmosphere (for example, dry nitrogen) or in vacuo. If it is desired to use the catalyst on a support material (see below), this can be achieved, for example, by preforming the catalyst system comprising the three components and impregnating the support material preferably with a solution thereof, or by introducing to the support material one or more of the components simultaneously or sequentially. If desired, the support material itself can have the properties of a neutral Lewis base and can be employed as, or in place of, the aforesaid third component. An example of a support material having neutral Lewis base properties is poly(aminostyrene) or a copolymer of styrene and aminostyrene (ie vinylaniline).

The catalysts of the present invention can, if desired, comprise more than one of the defined transition metal compounds. The catalyst may comprise, for example, a mixture of 2,6-diacetylpyridinebis(2,6-diisopropylanil) $FeCl_2$ complex and 2,6-diacetylpyridinebis(2,4,6-trimethylanil)$FeCl_2$ complex, or a mixture of 2,6-diacetylpyridine(2,6-diisopropylanil)$CoCl_2$ and 2,6-diacetylpyridinebis(2,4,6-trimethylanil)$FeCl_2$. In addition to said one or more defined transition metal compounds, the catalysts of the present invention can also include one or more other types of transition metal compounds or catalysts, for example, transition metal compounds of the type used in conventional Ziegler-Natta catalyst systems, metallocene-based catalysts, or heat activated supported chromium oxide catalysts (eg Phillips-type catalyst).

The catalyst employed in the process step (a) of the present invention can be unsupported or supported (absorbed or adsorbed or chemically bound) on a convenient conventional support material. Suitable solid particle supports are typically comprised of polymeric or refractory oxide materials, each being preferably porous, such as for example, talc, inorganic oxides, inorganic chlorides, for example magnesium chloride, and resinous support materials such as polystyrene, polyolefin, or other polymeric compounds or any other organic support material and the like that has an average particle size preferably greater than 10 $\mu$m. The preferred support materials are inorganic oxide materials, which include those from the Periodic Table of Elements of Groups 2, 3, 4, 5, 13 or 14 metals or metalloid oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the support material has a surface area in the range of from about 10 to about 700 m²/g, pore volume in the range of from about 0.1 to about 4.0 cc/g and average particle size in the range of from about 10 to about 500 μm. More preferably, the surface area is in the range of from about 50 to about 500 m²/g, the pore volume is in the range of from about 0.5 to about 3.5 cc/g, and the average particle size is in the range of from about 20 to about 200 μm. Most preferably, the surface area range is from about 100 to about 400 m²/g; the pore volume is from about 0.8 to about 3.0 cc/g, and the average particle size is from about 30 to about 100 μm. The pore size of the carrier of the invention typically has pore size in the range of from 10 to about 1000 Å, preferably 50 to about 500 Å, and more preferably 75 to about 350 Å. The bulky ligand transition metal compound is deposited on the support generally at a loading level of 100 to 10 micromoles of transition metal compound to gram of solid support; more preferably from 80 to 20 micromoles of transition metal compound to gram of solid support; and most preferably from 60 to 40 micromoles of transition metal compound to gram of solid support. While the bulky ligand transition metal compound can be deposited on the support at any level up to the pore volume of the support, loading levels of less than 100 micromoles of transition metal compound to gram of solid support are preferred, with less than 80 micromoles of transition metal compound to gram of solid support being more preferred, and less than 60 micromoles of transition metal compound to gram of solid support being most preferred.

Impregnation of the support material can be carried out by conventional techniques, for example, by forming a solution or suspension of the catalyst components in a suitable diluent or solvent, or slurrying the support material therewith. The support material thus impregnated with catalyst can then be separated from the diluent for example, by filtration or evaporation techniques. If desired, the catalysts can be formed in situ in the presence of the support material, or the support material can be pre-impregnated or premixed, simultaneously or sequentially, with one or more of the catalyst components. Formation of the supported catalyst can be achieved, for example, by treating the transition metal compounds of the present invention with alumoxane in a suitable inert diluent, for example, a volatile hydrocarbon, slurrying a particulate support material with the product and evaporating the volatile diluent. The produced supported catalyst is preferably in the form of a free-flowing powder. The quantity of support material employed can vary widely, for example from 100,000 to 1 grams per gram of metal present in the transition metal compound.

The polymerization conditions employed in step (a) of the method of this invention can be, for example, either solution phase, slurry phase, or gas phase and either batch, continuous or semi-continuous, with polymerization temperatures ranging from −100° C. to +300° C. In the slurry phase process and the gas phase process, the catalyst is generally fed to the polymerization zone in the form of a particulate solid. This solid can be, for example, an undiluted solid catalyst system formed from the bulky ligand transition metal complex employed in the method of the present invention and an activator, or can be the solid complex alone. In the latter situation, the activator can be fed to the polymerization zone, for example as a solution, separately from or together with the solid complex.

In the slurry phase polymerisation process, the solid particles of catalyst, or supported catalyst, are fed to a polymerisation zone either as dry powder or as a slurry in the polymerisation diluent. Preferably, the particles are fed to a polymerisation zone as a suspension in the polymerisation diluent. The polymerisation zone can be, for example, an autoclave or similar reaction vessel, or a continuous loop reactor, e.g. of the type well-known in the manufacture of polyethylene by the Phillips Process.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst bed. The bed is generally cooled by addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from liquid, or substantially free from liquid. As is well known to those skilled in the art, if any liquid is allowed to enter the polymerisation zone of a gas phase polymerisation process, the quantity of liquid is small in relation to the quantity of polymer present in the polymerisation zone. This is in contrast to "solution phase" processes wherein the polymer is formed dissolved in a solvent, and "slurry phase" processes wherein the polymer forms as a suspension in a liquid diluent.

Step (a) of the present invention can be operated under batch, semi-batch, or so-called "continuous" conditions by methods that are well known in the art. The polymerisation process of the step (a) of the method of the present invention is preferably carried out at a temperature above 0° C., more preferably above 15° C., and most preferably in the range of 25–150° C. Adjustment of the polymerisation within these defined temperature ranges can provide a useful means of controlling the average molecular weight of the produced polymer. It is also preferred to conduct step (a) under relatively low hydrogen partial pressures, more preferably less than 100 psig and most preferably less than 50 psig.

Monomers that are suitable for use as the olefin that undergoes reaction in step (a) of the process of the present invention are alpha-olefins which have (1) at least one hydrogen on the 2-carbon atom, (2) at least two hydrogens on the 3-carbon atoms, and (3) at least one hydrogen on the 4-carbon (if at least 4 carbon atoms are present in the olefin). Preferably such monomers contain from four to twenty carbon atoms. Thus, suitable alpha-olefin monomers include those represented by the formula $H_2C=CHR^{60}$ wherein $R^{60}$ is a straight chain or branched chain alkyl radical comprising 1 to 18 carbon atoms and wherein any branching that is present is at one or more carbon atoms that are no closer to the double bond than the 4-carbon atoms. $R^{60}$ is an alkyl, preferably containing from 1 to 19 carbon atoms, and more preferably from 2 to 13 atoms. Therefore, useful alpha-olefins include propylene, 1-butene, 1-pentene, 4-methyl-1-pentene, 1-hexene, 1-heptene, 1-octene, 1-nonene, 1-decene, 1-dodecene, 1-tridecene, 1-tetradecene, 1-pentadecene, 1-hexadecene, 1-heptadecene, 1-octadecene, 1-nonadecene and mixtures thereof. Preferably the olefin undergoing reaction contains from four to twenty carbon atoms.

Step (a) of the process of the present invention is controlled to make polymer having a number average molecular weight of not greater than 15,000 and typically from 300 to 15,000, and preferably from 400 to 8,000. The number average molecular weight for such polymers can be determined by any convenient known technique. One convenient method for such determination is by size exclusion chromatography (also known as gel permeation chromatography, GPC) which additionally provides molecular weight distribution information (see W. W. Yau, J. J. Kirkland and D. D. Bly, "Modern Size Exclusion Liquid Chromatography", John Wiley and Sons, N.Y., 1979). The molecular weight distribution (Mw/Mn) of the polymers or copolymers produced in step (a) is typically less than 5, preferably less than 4, more preferably less than 3, e.g., between 1.5 and 2.5.

When catalyst of the Formula 2, 3, or 4 is employed, the polymers produced in step (a) of this invention are further characterized in that up to about 50% or more of the polymer chains possess terminal ethylenylidene-type unsaturation. A minor amount of the polymer chains can contain terminal vinyl unsaturation, that is, POLY-CH=CH$_2$, and a proportion of the polymers can contain internal monounsaturation, for example, POLY-C(T$^1$)=CH(T$^2$), wherein T$^1$ and T$^2$ are each independently an alkyl group containing 1 to 18, preferably to 8 carbon atoms and POLY represents the polymer chain. The polymer products of step (a) of this inventive process comprise chains which can be saturated by hydrogen, but preferably contain polymer chains wherein at least 50, preferably at least 60, and more preferably at least 75 percent (e.g. 75–98%), of which exhibit terminal ethenylidene (vinylidene) unsaturation. The percentage of polymer chains exhibiting terminal ethenylidene unsaturation may be determined by Fourier Transform Infrared (FTIR) spectroscopic analysis, titration, proton (H)NMR, or C$^{13}$NMR. It is preferred to conduct step (a) under relatively low hydrogen partial pressures, more preferably less than 100 psi and most preferably less than 50 psi.

In one preferred embodiment, step (a) is conducted under solution phase conditions using a catalyst system comprising a catalyst of Formula 2, 3 or 4, in which M is a Group IVb transition metal, typically titanium, zirconium or hafnium, and aluminoxane as an activator with the molar ratio of aluminoxane to metallocene of 150 or greater, and C$_3$–C$_{20}$ alpha-olefins in a feedstock containing more than 1 weight percent of at least one volatile hydrocarbon liquid but consisting essentially of the C$_3$–C$_{20}$ alpha-olefins, are polymerized to form an essentially terminally-unsaturated, viscous, essentially-1-olefin-containing poly(1-olefin) or copoly(1-olefin), having a terminal vinylidene content of more than 50%.

In this preferred embodiment, the terminally unsaturated, viscous polymer product of this invention is essentially a poly(1-olefin) or copoly(1-olefin). The polymer chains of the viscous polymers produced in step (a) of the method of this invention are essentially terminally-unsaturated. By essentially terminally-unsaturated is meant that preferably more than about 90% of the polymer chains contain unsaturation, more preferably more than about 95% of the polymer chains in the product polymer contain terminal unsaturation.

When a catalyst of Formula 5, 6, 7 or 8 is employed, the polymers produced in step (a) of this invention are further characterized, following removal of lights (<C26), by having a viscosity between 5 and 5000 cSt, a viscosity index between 110 and 230, a pour pt less than –20° C., and a Noack volatility at 250° C. between 1% and 20%.

When a catalyst of Formula 9, 10, 11 or 12 is employed, the polymers produced in step (a) of this invention are further characterized, following removal of lights (<C26), by having a viscosity between 5 and 5000 cSt, a viscosity index between 110 and 200, a pour pt less than –20° C., and Noack volatility at 250° C. between 1% and 20%.

In general, the products produced in step (a) are mixtures whose components and their relative amounts depend upon the particular alpha-olefin reactant, the catalyst and reaction conditions employed. Typically, the products are unsaturated and have viscosities ranging from about 2 to about 5000 cSt at 100° C. At least a portion of the product mixture generally has the desired properties, for example, viscosity, for a particular application. The components in such portion are usually hydrogenated to improve their oxidation resistance and are known for their superior properties of long-life, low volatility, low pour points and high viscosity indices, which make them a premier basestock for state-of-the-art lubricants and hydraulic fluids.

However, usually such product mixture includes substantial amounts of unreacted olefin feed as well as product components which do not have the desired properties or do not include the relative amounts of each viscosity product which correspond to market demand. Thus, step (a) is often performed under conditions that are necessary to produce a product mixture that contains an undesired excess or inadequate amount of one product in order to obtain the desired amount of another product.

The process of the present invention solves this problem by fractionating the product mixture produced in step (a) in order to separate and recover one or more fraction, containing the components having the desired properties and separating one or more other fraction of the product mixture for additional processing in step (b) of the method of this invention. In a less preferred alternative, the entire product from step (a) can be oligomerized in step (b).

The fraction(s) selected for additional processing is then subjected to oligomerization conditions in contact with an oligomerization catalyst in step (b) such that a product mixture containing at least one product having desired properties and in a desired amount that is not produced in step (a). Typically, the low molecular weight fraction of the product of step (a) is separated and oligomerized in step (b). In three alternative preferred embodiments, in one case the monomeric and dimeric components of the product of step (a), in a second case the dimeric components of the product of step (a), and in a third case the dimeric and a portion of the trimeric components with or without monomeric components of the product of step (a) are separated and oligomerized in step (b). Thus, step (b) permits the olefin feed to step (a) to be converted with greater efficiency to desired amounts of products having desired properties. Thus, the method of the present invention permits improved control of the makeup of the feed and permits a wide range of customer specific oligomer oil products to be produced.

For example, the higher molecular weight portion of the product of step (a) has advantageous properties when compared to polyalphaolefin products that are currently in the marketplace. To illustrate, when 1-decene is employed as the feedstock to step (a), the higher molecular weight distillation portion of the product of step (a) is primarily C$_{30}$+ and has advantages relative to a polyalphaolefin having a viscosity of 6 cSt or higher because it has a higher viscosity index than the polyalphaolefin having a comparable viscosity. For example, in Example 1 hereinbelow the higher molecular weight distillation bottoms fraction of the product of step (a) has a viscosity of 9.5 cSt at 100° C. and a viscosity index of 161 by comparison to the current commercially available polyalphaolefin having a viscosity of 9.4–10 cSt at 100° C. and a viscosity index of only 137. Similarly, in Example 3 hereinbelow, the higher molecular weight distillation bottoms fraction has a viscosity of 6 cSt at 100° C. and a viscosity index of 153 by comparison to the current commercially available polyalphaolefin having a viscosity of 5.8–6.0 cSt at 100° C. and a viscosity index of 135. Furthermore, when step (a) of Example 1 is performed at a temperature of 40° C., the higher molecular weight distillation bottoms fraction of the product of step (a) has a viscosity of 40 cSt at 100° C. and a viscosity index of 180 by comparison to the current commercially available polyalphaolefin having a viscosity of 40 cSt at 100° C. and a viscosity index of 151.

However, the remaining lower molecular weight portion of the product step (a) is a relatively large volume of low value and lighter oligomeric (primarily monomeric and dimeric) fraction. The method of this invention serves to upgrade this lower molecular weight portion of the product of step (a), which is separated from the aforesaid higher molecular weight portion by any convenient conventional means, for example, distillation, and is then upgraded in step (b). For example, when 1-decene is employed as the feedstock to step (a), and when the portion of the product of step (a) containing 20 carbon atoms and less is employed as the feed or portion of the feed to step (b), this low molecular weight portion of the products from step (a) is converted in step (b) to a product mixture in which at least 60%, preferably over 70%, and most preferably over 80% of this crude product mixture contains greater than 24 carbon atoms, preferably greater than 27 carbon atoms, and most preferably greater than 29 carbon atoms. The product mixture of step (b) also contains at most 25%, and preferably not more than 15% of carbon numbers greater than C48; preferably the product mixture of step (b) contains less than 25%, and preferably less than 15% of carbon numbers greater than C38. The product of step (b) has sufficiently low volatility, a sufficiently high viscosity index, a desirable viscosity in the rage of 4 to 5.5 cSt at 100° C. and less than 5500 cSt at −400° C., and a sufficiently low pour point to serve as base fluids or portions of base fluids for 0W- and 5W- passenger car motor oils and heavy-duty diesel oils.

Generally, engine oil formulations, and more particularly 0-W and 5-W engine oil formulations, that comprise at least the fraction of the product mixture of step (b) at least 60 weight percent of which are oligomers that contain three monomeric units (as defined below) are especially advantageous.

Any suitable oligomerization catalyst known in the art, especially an acidic oligomerization catalyst system, and especially Friedel-Crafts type catalysts such as acid halides (Lewis Acid) or proton acid (Bronsted Acid) catalysts can be employed as the oligomerization catalyst of step (b). Examples of such oligomerization catalysts include but are not limited to $BF_3$, $BCl_3$, $BBr_3$, sulfuric acid, anhydrous HF, phosphoric acid, polyphosphoric acid, perchloric acid, fluorosulfuric acid, aromatic sulfuric acids, and the like. Like the catalyst employed in step (a), the oligomerization catalyst of step (b) can be unsupported or supported (absorbed, adsorbed or chemically bound) on a convenient conventional support material. Suitable supports materials and their characteristics and impregnation techniques all discussed hereinabove with respect to the catalyst employed in step (a).

Such oligomerization catalysts can be used in combination and with promoters such as water, alcohols, hydrogen halide, alkyl halides and the like. A preferred catalyst system for the oligomerization process of step (b) is the $BF_3$-promoter catalyst system. Suitable promoters are polar compounds and preferably alcohols containing about 1 to 10 carbon atoms such as methanol, ethanol, isopropanol, n-propanol, n-butanol, isobutanol, n-hexanol, n-octanol and the like. Other suitable promoters include, for example, water, phosphoric acid, fatty acids (e.g. valeric acid) aldehydes, acid anhydrides, ketones, organic esters, ethers, polyhydric alcohols, phenols, ether alcohols and the like. The ethers, esters, acid anhydrides, ketones and aldehydes provide good promotion properties when combined with other promoters which have an active proton e.g. water or alcohols.

Amounts of promoter are used which are effective to provide good conversions in a reasonable time. Generally, amounts of 0.01 weight percent or greater, based on the total amounts of olefin reactants, can be used. Amounts greater than 1.0 weight percent can be used but are not usually necessary. Preferred amounts range from about 0.025 to 0.5 weight percent of the total amount of olefin reactants. Amounts of $BF_3$ are used to provide molar ratios of $BF_3$ to promoter of from about 0.1 to 10:1 and preferably greater than about 1:1. For example, amounts of $BF_3$ of from about 0.1 to 3.0 weight percent of the total amount of olefin reactants are employed.

The amount of catalyst used can be kept to a minimum by bubbling $BF_3$ into an agitated mixture of the olefin reactant only until an "observable" condition is satisfied, i.e. a 2°–4° C. increase in temperature. Because the vinylidene olefins are more reactive than vinyl olefin, less $BF_3$ catalyst is needed compared to the vinyl olefin oligomerization process normally used to produce PAO's.

The high degree of vinylidine type unsaturation of the product of step (a) when catalysts of Formula 2, 3, or 4 are used makes the product very reactive in the oligomerization of step (b). In addition, since either the entire amount of product of step (a) or one or more preselected fractions of it can be oligomerized in step (b), it is possible in the method of this invention to tailor the feedstock to step (b) in order to produce the desired relative amounts of each viscosity product desired without producing an excess of one product in order to obtain the desired amount of another product which is desired.

A further embodiment of the method of this invention is to co-oligomerize in step (b) a pre-selected fraction of the product of step (a) with at least one vinyl olefin containing 4 to 20 carbon atoms. This allows for conversion of a fraction of the product of step (a) which may not be useful, for example, the dimer fraction, to a higher fraction, for example, a trimer fraction, which is useful. The addition of a different vinyl olefin than used in step (a) to the feed of step (b) permits further control of the make-up of the feed to step (b), and an even wider range of customer specific oligomer oils to be produced. It also allows for production of an oligomer fraction which could not easily be made from other means, for example, co-oligomerizing the $C_{20}$ polymer from step (a) with $C_{12}$ vinyl olefin in step (b) to form primarily a $C_{32}$ product. In addition, the distribution of products is highly peaked in favor of the new product and requires minimal fractionation. The identity of the vinyl olefin employed and the relative amounts of vinyl olefin and aforesaid fraction of the product mixture of step (a) in step (b) can be varied to control the amount of products formed in step (b).

Suitable vinyl olefins for use as additional compounds to be added to the feed to step (b) in the process contain from 4 to about 30 carbon atoms, and, preferably, about 6 to 20 carbon atoms, including mixtures thereof. Non-limiting examples include 1-butene, 1-pentene, 1-hexene, 1-heptene, 1-octene, 1-decene, 1-dodecene, 1-tetradecene, 1-hexadecene, 1-octadecene, 1-eicosene and the like. Pure vinyl olefins or a mixture of vinyl olefins and vinylidene and/or internal olefins can be used. Usually, the feed contains at least about 85 weight percent vinyl olefin. Additionally, step (b) can be run so that only a fraction of the vinyl olefin reacts with the preselected polymer fraction from step (a).

The oligomerization of step (b) is very specific for the formation of an oligomer containing three monomeric units. The product mixture formed in step (b) contains less than 35%, preferably less than 25%, more preferably less than 15% by weight of oligomers that contain two or less monomeric units. The product mixture formed in step (b) also contains at least 65%, preferably at least 75%, more preferably at least 85% by weight of oligomers that contain three or more monomeric by weight units, and less than 20%, preferably less than 15%, more preferably less than 10% by weight of four or more monomeric units. Thus, the product mixture formed in step (b) generally contains at least 60%, preferably at least 65%, more preferably at least 70%, and most preferably at least 80% by weight of oligomers having three monomeric units.

As employed in this context, the term "monomeric units" is intended to mean both (i) the monomer(s) employed in the feed to step (a) and (ii) the monomer(s) added in step (b) to the portion of the product from step (a) that is employed as the feed to step (b). Each such monomer can be the source of one or more of the monomeric units that make up an oligomer in the product produced in step (b). Thus, if no additional vinyl olefinic monomer is added to the portion of the product from step (a) that is employed in the feed to step (b), the monomers employed in the feed to step (a) are the source of all of the monomeric units in the products formed in step (b). However, if one or more vinyl olefinic monomers are added to the portion of the product from step (a) that is employed in the feed to step (b), both (i) such monomers added in step (b) and (ii) the monomers employed in the feed to step (a) are sources of the monomeric units in the products formed instep (b).

For example, if 1-decene is the feed to step (a) and no other vinyl monomer is added to the feed to step (b), the oligomers formed in step (b) and having three monomeric units are primarily trimers of 1-decene. However, if 1-decene is employed as the feed to step (a) and 1-dodecene is added to the feed to step (b), then the oligomers formed in step (b) and having three monomeric units primarily have 30, 32, 34 or 36 carbon atoms, with the relative amounts of each depending upon the relative amount of 1-dodecene added.

By varying the choice of the fraction of the product of step (a) that is employed in the feed to step (b) and of the vinyl olefin added in step (b), customer-specific oligomer oil products can be produced. For example, the viscosity of such a product can be varied by changing the amount and type of vinyl olefin added to the reaction mixture for the second step. A range of molar ratios of aforesaid pre-selected fraction of the product of step (a) to the vinyl olefin added can be varied, but usually at least a molar equivalent amount of vinyl olefin to the dimeric portion of the aforesaid pre-selected fraction of the product of step (a) is used in order to consume the dimeric portion of the aforesaid pre-selected fraction of the product of step (a). The product oils have viscosities of from about 1 to 20 cSt at 100° C. Preferably, mole ratios of from about 10:1 to 1:1.5 and most typically about 1.3:1 of the added vinyl olefin to the aforesaid pre-selected fraction of the product of step (a) are used for the feed to step (b). The vinyl olefin is typically added at a time when at least about 30 percent by weight of the aforesaid pre-selected fraction of the product of step (a) has been oligomerized in step (b).

Step (b) can be carried out at atmospheric pressure. Moderately elevated pressures, e.g. to 50 pounds per square inch, can be used and may be desirable to minimize reaction time but are not necessary because of the high reactivity of the vinylidene olefin. Reaction times and temperatures in step (b) are chosen to efficiently obtain good conversions to the desired product. Generally, temperatures of from about 0° to 70° C. are used with total reaction times of from about 15 minutes to 5 hours.

The products from step (b) of the method of the present invention do have the pre-selected desired properties, especially viscosity. Typically, the products of step (b) are characterized, following removal of unreacted monomer and dimer, by having a viscosity between 3 and 100 cSt, a viscosity index between 110 and 180, a pour pt less than −30° C., and a Noack volatility at 250° C. between 2% and 25%.

Another alternative for use in step (a) of the method of this invention is the use of a supported reduced Group VIB metal, preferably chromium, in the form of its oxide, instead of the bulky ligand transition metal complex of Formula 1. An example of such supported reduced Group VIB metal is the well-known Phillips catalyst.

The following examples will serve to illustrate certain specific embodiments of the invention disclosed herein. These examples are for illustrative purposes only and should not be construed as limiting the scope of the novel invention disclosed herein as there are many alternative modifications and variations which will be apparent to those skilled in the art and which fall within the scope and spirit of the disclosed invention.

EXAMPLES

All manipulations with the metallocenes and other organometallic compounds were carried out in a glove box under nitrogen. Determination of the amount of terminal vinylidene in a fluid sample was made using NMR by integration of the peak area in the olefinic regions. Molecular weights were determined using gel permeation chromatography (GPC). All viscometric properties were measured using appropriate ASTM methods.

The first three examples illustrate the polymerizations in step (a) of 1-decene catalyzed by zirconocene dichloride with a methylaluminoxane activator at three different temperatures. Example 14 differs in that instead zirconocene dimethyl with a borate activator is employed in step (a).

Example 1

A 2-liter Parr reactor under nitrogen was charged with 1096 g of dry 1-decene and was taken to 65° C. with stirring. The catalyst was prepared by pre-mixing for 10 minutes a solution of 37.0 mg of bis(cyclopentadienyl)zirconium dichloride in 20 mL of toluene with 38.9 mL of a solution of methylaluminoxane (MAO) in toluene (10 wt % in toluene, d=0.860 g/mL, 5.08 wt % Al). The catalyst solution was injected to the Parr reactor using an injection vessel. The reaction was stirred at temperature (65° C.) for 3 hours and then quenched by pouring the content into a quench vessel containing 200 mL of 2N NaOH and the organic layer was washed. The organic layer was subsequently washed with distilled water (2×200 mL) and dried over $MgSO_4$. Removal of unreacted decene under reduced pressure resulted in isolation of 948.5 g of a clear fluid. Further distillation of this fluid under reduced pressure resulted in isolation of 294.1 g (31.0%) of the dimeric C20 fluid having greater than 80% vinylidene by NMR. Once the dimer was removed, the bottom fraction was hydrogenated under a set of standard hydrogenation conditions (at 170° C., 400 psi hydrogen, using Ni on Kieselguhr catalyst) to produce a high viscosity index (VI) synthetic basestock having the following properties:

| | |
|---|---|
| KV @ 100° C., cSt | 9.50 |
| KV @ 40° C., cSt | 54.1 |
| KV @ −40° C., cSt | 14825 |
| Viscosity Index (VI) | 161 |
| Pour Point, C. | −56 |
| Noack @ 250, % Loss | 6.7 |

Example 2

This experiment was conducted in a manner identical to Example 1 with the exception of polymerization temperature being at 75° C. After quench and washing, removal of unreacted decene under reduced pressure resulted in isolation of 941.8 g of a clear fluid. Further distillation of this fluid under reduced pressure resulted in isolation of 369.4 g (39.2%) of the dimeric C20 fluid having greater than 80% vinylidene by NMR. Once the dimer was removed, the bottom fraction was hydrogenated under a set of standard hydrogenation conditions (at 170° C., 400 psi hydrogen, using Ni on Kieselguhr catalyst) to produce a high viscosity index (VI) synthetic basestock having the following properties:

| | |
|---|---|
| KV @ 100° C., cSt | 7.0 |
| KV @ 40° C., cSt | 36.2 |
| KV @ −40° C., cSt | 8036 |
| Viscosity Index (VI) | 155 |
| Pour Point, C. | −62 |
| Noack @ 250, % Loss | 8.6 |

Example 3

This experiment was conducted in a manner identical to Example 1 with the exception of polymerization temperature being at 100° C. After quench and washing, removal of unreacted decene under reduced pressure resulted in isolation of 908.6 g of a clear fluid. Further distillation of this fluid under reduced pressure resulted in isolation of 475.8 g (52.4%) of the dimeric C20 fluid having greater than 80% vinylidene by NMR. Once the dimer was removed, the bottom fraction was hydrogenated under a set of standard hydrogenation conditions (at 170° C., 400 psi hydrogen, using Ni on Kieselguhr catalyst) to produce a high viscosity index (VI) synthetic basestock having the following properties:

| | |
|---|---|
| KV @ 100° C., cSt | 5.5 |
| KV @ 40° C., cSt | 26.5 |
| KV @ −40° C., cSt | 4822 |
| Viscosity Index (VI) | 152 |
| Pour Point, C. | −69 |
| Noack @ 250, % Loss | 9.1 |

Examples 4–13

This series of experiments shows improved processes for production of low and high viscosity, polyalphaolefins having unique alkyl substitutions on the metallocenes resulting in improved yields for a given range of viscosities. These experiments were conducted in a manner similar to Example 1 employing 0.035 mmol of metallocene in each experiment with 7.1 mL of a solution of methylaluminoxane (MAO) in toluene (10 wt % in toluene, d=0.860 g/mL, 4.54 wt % Al) Examples 6–8 indicate that mono-alkyl substitutions wherein the alky substitutions is primary and secondary radicals such as methyl, n-butyl, and isopropyl groups are useful for production of low viscosity polyalphaolefins (for viscosities in the range of 2–20 cSt at 100 C.) with improved yields whereas tertiary alkyl groups are poor (Example 9). Examples 10–11 indicate that di, tri, or tetra-alkyl substitutions on the Cp rings of the metallocenes are useful for production of high viscosity polyalphaolefins (for viscosities in the range of 20–5,000 cSt at 100 C.) with improved yields whereas penta-alkyl groups are poor (Example 13). If properties are not measured, it is designated as ND:

| Example | Catalyst | C10 (g) | Temperature C. | Yield | % Dimer | KV @ 100° C., cSt | Pour Point C. | Viscosity Index (VI) |
|---|---|---|---|---|---|---|---|---|
| 4 | (Cp)$_2$ZrCl$_2$ | 1099 | 70 | 621.2 | 24.3 | 17.5 | −57 | 167 |
| 5 | (Cp)$_2$ZrCl$_2$ | 1098 | 110 | 248.1 | 55.3 | 5.9 | −66 | 152 |
| 6 | (Me-Cp)$_2$ZrCl$_2$ | 1098 | 110 | 404.8 | 40.4 | 8.2 | −60 | 159 |
| 7 | (nBu-Cp)$_2$ZrCl$_2$ | 1100 | 110 | 403 8 | 49.1 | 6 7 | −63 | 156 |
| 8 | (iPr-Cp)$_2$ZrCl$_2$ | 1099 | 110 | 401.5 | 49.5 | 5.7 | −63 | 152 |
| 9 | (tBu-Cp)$_2$ZrCl$_2$ | 1095 | 70 | 78.9 | 31.7 | ND | ND | ND |
| 10 | (1,3Me$_2$-Cp)$_2$ZrCl$_2$ | 1102 | 70 | 741.5 | 6.4 | 61.2 | −48 | 190 |
| 11 | (1,3Me$_2$-Cp)$_2$ZrCl$_2$ | 1114 | 110 | 657.1 | 15.2 | 16.5 | −57 | 162 |
| 12 | [(CH$_3$)$_4$ Cp]$_2$ZrCl$_2$ | 1147 | 70 | 773.9 | 1.4 | 154 0 | ND | ND |
| 13 | [(CH$_3$)$_5$ Cp]$_2$ZrCl$_2$ | 1121 | 70 | 150.5 | 4.8 | 114.6 | −42 | 224 |

Example 14

A 2-liter Parr reactor under nitrogen was charged with 882 g of dry 1-decene was heated to 100° C. with stirring. The catalyst was prepared by pre-mixing for 10 minutes a solution of 3.5 mg of bis(cyclopentadienyl)zirconium dimethyl in 20 mL of toluene with 11.1 mg of a solution of N,N-dimethylanalinium tera(perfluorophenyl)borate in 50 mL toluene and 0.20 mL of triisobutylaluminum. The catalyst solution was injected to the Parr reactor using an injection vessel. The reaction was stirred at temperature (100° C.) for 3 hours and then quenched by pouring the content into a quench vessel containing 200 mL of 2N NaOH and the organic layer was washed. The organic layer was subsequently washed with distilled water (2×200 mL) and dried over $MgSO_4$. Removal of unreacted decene under reduced pressure resulted in isolation of 107.2 g of a clear fluid. Further distillation of this fluid under reduced pressure resulted in isolation of 49.2 g (24.9%) of the dimeric C20 fluid having about 60% vinylidene by NMR. Once the dimer was removed, the bottom fraction was hydrogenated under a set of standard hydrogenation conditions (at 170° C., 400 psi hydrogen, using Ni on Kieselguhr catalyst) to produce a high viscosity index (VI) synthetic basestock having the following properties:

| | |
|---|---|
| KV @ 100° C., cSt | 11.4 |
| KV @ 40° C., cSt | 68.6 |
| KV @ −40° C., cSt | 24210 |
| Viscosity Index (VI) | 160 |
| Pour Point, C. | −57 |
| Noack @ 250, % Loss | 5.5 |

The following table shows % C20 (decene dimer) isolated from Examples 1–3 and 14. NMR analysis indicates greater than 80% vinylidene olefin for Examples 1–3, Example 14 shows a vinylidene olefin content of about 60%:

| | % C20 Dimer |
|---|---|
| Example 1 | 31.0 |
| Example 2 | 39.2 |
| Example 3 | 52.4 |
| Example 14 | 24.9 |

Examples 15–18

This series of experiments shows improved processes for production very low viscosity polyalphaolefins wherein the first step of the polymerization process is conducted under low hydrogen partial pressures resulting in improved yields. These experiments were conducted in a manner similar to Example 14 employing 0.035 mmol of metallocene in each experiment and 1 molar equivalent of N,N-dimethylanalinium tetra(perfluorophenyl)borate as co-catalyst:

In Example 19, the dimer (C20) fraction from the product of step (a) in Examples 1–3 is reacted with 1-decene in step (b) to form a more useful product, primarily trimer (C30) and tetramer (C40). Example 20 demonstrates that the product of step (b) is unaffected if the dimer fraction of the product of step (a) is made using a borate activator or an MAO activator.

Example 19

A 1-gallon Parr reactor was charged with 643.0 g of the C20 dimeric and lower molecular weight fluid isolated from Examples 1–3, 357.0 g 1-decene, 2.0 g 1-butanol and was taken to 50° C. with stirring. Boron trifluoride was introduced and it was adjusted slowly to a steady state pressure of 20 psi. The reaction mixture was stirred for 90 minutes. The reaction mixture was quenched with 500 g of 8% NaOH and washed with distilled water. Removal of unreacted and volatile fluids under reduced pressure (200° C., 0.05 mmHg) resulted in isolation of 804.7 g of a clear fluid which was hydrogenated under a set of standard hydrogenation conditions (at 170 C., 400 psi hydrogen, using Ni on Kieselguhr catalyst) to produce a high viscosity index (VI) synthetic basestock having the following properties:

| | |
|---|---|
| KV @ 100° C., cSt | 4.3 |
| KV @ 40° C., cSt | 19.4 |
| KV @ −40° C., cSt | 2942 |
| Viscosity Index (VI) | 134 |
| Pour Point, C. | <−66 |
| Noack @ 250, % Loss | 10.3 |

Gas chromatographic analysis of the undistilled product indicated the following oligomeric distribution: 4% unreacted C10, 9% C20, 65% C30, 16% C40, 3% C50

Example 20

A 1-gallon Parr reactor was charged with 536.0 g of the C20 dimeric fluid isolated from runs identical to Example 14 (metallocene/borate catalyst system), 356.0 g 1-decene, 1.0 g 1-propanol and was taken to 35° C. with stirring. Boron trifluoride was introduced and it was adjusted slowly to a steady state pressure of 20 psi. The reaction mixture was stirred for 2 hours. Product was isolated in a manner identical to Example 19 resulting in isolation of 700.9 of a clear fluid prior to hydrogenation. Gas chromatographic analysis of this product mixture was virtually identical to the product isolated when the C20 dimeric fluid of this experiment was replaced with C20 fluid of Example 1–3. This indicates fluids having the same physical properties are obtained for dimeric products derived from metallocene/MAO catalyst system (Examples 1–3) and metallocene/borate catalyst system (Example 14).

Example 21 illustrates the reaction of the dimer (C20) fraction of the product of step (a) with 1-dodecene to make

| Example | Catalyst | C10 (g) | Temperature C. | $H_2$ Partial Pressure, psi | Yield | % Dimer | KV @ 100° C., cSt | Pour Point C. |
|---|---|---|---|---|---|---|---|---|
| 15 | $(Cp)_2ZrME_2$ | 1096 | 110 | 0 | 157.3 | 35.7 | 6.7 | −59 |
| 16 | $(Cp)_2ZrME_2$ | 1049 | 110 | 50 | 366.5 | 40.7 | 6.7 | −59 |
| 17 | $(iPr-Cp)_2ZrCl_2$ | 1072 | 110 | 0 | 242.7 | 35.9 | 5.4 | −66 |
| 18 | $(iPr-Cp)_2ZrCl_2$ | 1047 | 110 | 50 | 531.7 | 41.6 | 5.3 | −69 | a product of step (b), primarily C32, which could not easily be made in a high yield by any one-step process. Example 27 differs from Example 21 in that tetradecene is used in step (b), again to make a product, primarily C34, which also could not easily be made in high yield in any one-step process.

Example 25 illustrates the polymerization of 1-decene in step (a) followed by the removal of unreacted 1-decene, and the subsequent reaction of all of the remaining product of step (a) with 1-dodecene in step (b). Thus, the dimer portion of the product of step (a) can be converted to more useful higher oligomers in step (b) with or without first removing it from the rest of the product of step (a).

Example 21

A 1-gallon Parr reactor was charged with 651.2 g of the C20 dimeric fluid isolated from Examples 1–3, 400.1 g 1-dodecene, 1.0 g 1-propanol and was taken to 45° C. with stirring. Boron trifluoride was introduced and it was adjusted slowly to a steady state pressure of 20 psi. The reaction mixture was stirred for 2 hours. The reaction mixture was quenched with 500 g of 8% NaOH and washed with distilled water. Removal of unreacted and volatile fluids under reduced pressure (230° C., 0.05 mmHg) resulted in isolation of 870.2 g of a clear fluid which was hydrogenated under a set of standard hydrogenation conditions (at 170° C., 400 psi hydrogen, using Ni on Kieselguhr catalyst) to produce a high viscosity index (VI) synthetic basestock having the following properties:

| KV @ 100° C., cSt | 4.7 |
| KV @ 40° C., cSt | 21.8 |
| KV @ -40° C., cSt | 3870 |
| Viscosity Index (VI) | 141 |
| Pour Point, C. | <-63 |
| Noack @ 250, % Loss | 7.1 |

Gas chromatographic analysis of the undistilled product indicated the following oligomeric distribution: 4% unreacted C12, 4% C20, 2% C24, 64% C32, 19% C36, balance C40+. Gas chromatographic analysis of the product after removal of C12 and C20 components by distillation indicated the following oligomeric distribution: 1% C20, 2% C24, 65% C32, 16% C36, balance C40+

The product of Example 21 was further fractionated by distillation under reduced pressure into an overhead product with a viscosity of 4 cSt (KV @ 100° C., cSt) consisting of mainly a C32 composition with minor amounts of C36. The bottom product is essentially an improved 8 cSt oil (KV @ 100° C., cSt). The 4 cSt overhead product which constitutes about 87% of this mixture has significant improvements over commercial Durasyn 164 PAO in terms of viscometrics and volatility. Properties of the overhead product and bottom fractions and those of commercial Durasyn 164 are shown below:

| Overhead Fraction | |
| --- | --- |
| KV @ 100° C., cSt | 3.9 |
| KV @ 40° C., cSt | 16.3 |
| KV @ -40° C., cSt | 2161 |
| Viscosity Index (VI) | 140 |

| -continued | |
| --- | --- |
| Overhead Fraction | |
| Pour Point, C. | -60 |
| Noack @ 250, % Loss | 9.5 |

| Bottom Fraction | |
| --- | --- |
| KV @ 100° C., cSt | 7.8 |
| KV @ 40° C., cSt | 45.5 |
| KV @ -40° C., cSt | 14930 |
| Viscosity Index (VI) | 142 |
| Pour Point, C. | -57 |
| Noack @ 250, % Loss | 3.1 |

| Commercial Durasyn 164 from BP | |
| --- | --- |
| KV @ 100° C., cSt | 3.9 |
| KV @ 40° C., cSt | 17.2 |
| KV @ -40° C., cSt | 2540 |
| Viscosity Index (VI) | 122 |
| Pour Point, C. | -69 |
| Noack @ 250, % Loss | 15.3 |

Example 22

This run is similar to Example 21, but the cycle time was significantly reduced. In a batch reactor containing 150 grams of the oligomerized heel from a previous run, 600 grams of C20 vinylidene was reacted with 375 grams of 1-dodecene using 2 grams n-propanol co-catalyst at 20–40 psig BF3 pressure, at 40–45° C., for 20 minutes. Less than 15% of the original 1-dodecene charge remained unreacted. Work-up as in Example 21 afforded a 80% yield of product having a 100° C. viscosity of 4.74 cSt, and a viscosity index of 141. Gas chromatographic analysis of the undistilled product indicated the following oligomeric distribution: 5% C12, 3% C20, 4% C24, 69% 032, 12% C36, balance C40+. Gas chromatographic analysis of the product after removal of C12, C20 and C24 indicated the following oligomeric distribution: 1% C24, 80% C32, 12% C36, balance C40+.

Example 23

This run is similar to Example 21 except that a reduced quantity of catalyst was used. In a batch reactor 1200 grams of C20 vinylidene was reacted with 750 grams of 1-dodecene using 1.5 grams of n-propanol co-catalyst at 10–20 psig of $BF_3$ pressure, at about 40° C., for 3 hours. Less than 15% of the original 1-dodecene charge remained unreacted. Work-up as in Example 21 afforded a 79% yield of a product having a viscosity at 100° C. of 4.76 cSt. Gas chromatographic analysis of the undistilled product indicated the following oligomeric distribution: 2% C12, 5% C20, 3% C24, 73% C32, 9% C36, balance C40+

Example 24

This run is similar Example 21 except that the reaction, distillation, and hydrogenation were continuous rather than the batch process of Example 21. In a continuous run using 4 CSTR's in series with a total residence time of 30 minutes and a feed ratio of 324 grams of C20 vinylidene and 202 grams of C12 with a catalyst system 1 gram of n-propanol and 1 gram of BF3 at of 45° C. A continuous wash was followed by continuous stripping of C12, C20 and part of the C24. In the final step continuous hydrogenation afforded a 4.45 cSt product with a viscosity index of 142 at a 93% yield. Gas chromatographic analysis of the undistilled product indicated the following oligomeric distribution: 2% C12, 3% C20, 5% C24, 74% C32,12% C36, balance C40+. Gas chromatographic analysis of the product after removal of C12, C20 and C24 by distillation indicated the following oligomeric distribution: 1% C24, 78% C32, 15% C36, balance C40+.

Example 25

Initially, a 2-liter Parr reactor under nitrogen was charged with 1094 g of dry 1-decene and was taken to 100° C. with stirring. The catalyst was prepared by pre-mixing for 10 minutes a solution of 37.0 mg of bis(cyclopentadienyl) zirconium dichloride in 20 mL of toluene with 38.9 mL of a solution of methylaluminoxane (MAO) in toluene (10 wt % in toluene, d=0.860 g/mL, 5.08 wt % Al). The catalyst solution was injected to the Parr reactor using an injection vessel. The reaction was stirred at temperature (100° C.) for 3 hours and then quenched by pouring the content into a quench vessel containing 200 mL of 2N NaOH and the organic layer was washed. The organic layer was subsequently washed with distilled water (2×200 mL) and dried over $MgSO_4$. Removal of unreacted decene under reduced pressure resulted in isolation of 908.6 g of a clear fluid. In a subsequent step, a 1-gallon Parr reactor was charged with 710.0 g of above isolated fluid, 357.0 g 1-dodecene, 3.0 g 1-butanol and was taken to 50° C. with stirring. Boron trifluoride was introduced and it was adjusted slowly to a steady state pressure of 20 psi. The reaction mixture was stirred for 2 hours. The reaction mixture was quenched with 500 g of 8% NaOH and washed with distilled water. Removal of unreacted and volatile fluids under reduced pressure (220° C., 0.05 mmHg) resulted in isolation of 844.2 g of a clear fluid which was hydrogenated under a set of standard hydrogenation conditions (at 170° C., 400 psi hydrogen, using Ni on Kieselguhr catalyst) to produce a high viscosity index (VI) synthetic basestock having the following properties:

| | |
|---|---|
| KV @ 100° C., cSt | 5.5 |
| KV @ 40° C., cSt | 27.1 |
| KV @ -40° C., cSt | 5184 |
| Viscosity Index (VI) | 147 |
| Pour Point, C | -60 |
| Noack @ 250, % Loss | 7.1 |

Gas chromatographic analysis of the undistilled product indicated the following oligomeric distribution: 1% unreacted C12, 4% C20, 5% C24, 59% C32, balance C40+.

Example 26

This run is similar to Example 21 except that C12 alpha olefin was reacted with a mixture of C20 vinylidene and C30 vinylidene. In a batch reactor 300 grams of 1-dodecene was reacted with a mixture of 525 grams of C20 vinylidene, 210 grams of C30 vinylidene, and 12 grams of C40 vinylidene using 3 grams of n-propanol co-catalyst under 10 psig of BF3 at 40° C. for 50 minutes. Work-up as in Example 21 afforded a 4.83 cSt product at 100° C. with a viscosity index of 144 in 78% yield. Gas chromatographic analysis of the undistilled product indicated the following oligomeric distribution: 1% unreacted C12, 6% C20, 3% C24, 63% C32

Example 27

A 1-gallon Parr reactor was charged with 650.0 g of the C20 dimeric fluid isolated from Examples 1–3, 350.0 g 1-tetradecene, 1.0 g 1-propanol and was taken to 40° C. with stirring. Boron trifluoride was introduced and it was adjusted slowly to a steady state pressure of 20 psi. The reaction mixture was stirred for 2 hours. The reaction mixture was quenched with 500 g of 8% NaOH and washed with distilled water. Removal of unreacted and volatile fluids under reduced pressure (248° C., 0.05 mmHg) resulted in isolation of 846.7 g of a clear fluid which was hydrogenated under a set of standard hydrogenation conditions (at 170° C., 400 psi hydrogen, using Ni on Kieselguhr catalyst) to produce a high viscosity index (VI) synthetic basestock having the following properties:

| | |
|---|---|
| KV @ 100° C., cSt | 5.2 |
| KV @ 40° C., cSt | 24.9 |
| KV @ -40° C., cSt | 4920 |
| Viscosity Index (VI) | 147 |
| Pour Point, C | -51 |
| Noack @ 250, % Loss | 4.8 |

Example 28

A typical polymerization example employing a catalyst selected from formulas 5–12 is done as follows: A solution of 100 mg (0.068 mmol) of Pd-α-diimine complex [2,6-($^i$Pr)$_2$C$_6$H$_3$N=C(Me)—C(Me)=NC$_6$H$_3$2,6-($^i$Pr)$_2$Pd (CH$_2$)$_3$C(O)OMe]B{3,5-C$_6$H$_3$(CF$_3$)$_2$}$_4$ in 150 ml of chlorobenzene is transferred into a 2-liter Parr reactor under nitrogen. The reactor is heated to 65° C. and the solution is stirred by a mechanical stirrer at this temperature. The reactor is pressurized with ethylene to 100 kPa and the polymerization was continued for 10 hours. The reaction is depressurized from ethylene by venting and the reaction is quenched after 10 hours in a manner similar to Example 1 and the product is isolated. It is possible to produce product varying in viscosity from 2 to greater 500 cSt by changing the catalyst, polymerization temperature, ethylene pressure or a combination thereof.

Example 29

Another typical polymerization example employing catalyst selected from formulas 5–12 is done as follows: A solution of 100 mg (0.069 mmol) of Pd-α-diimine complex [2,6-($^i$Pr)$_2$C$_6$H$_3$N=C(H)—C(H)=NC$_6$H$_3$2,6-($^i$Pr)$_2$Pd (CH$_2$)$_3$C(O)OMe]B{3,5-C$_6$H$_3$(CF$_3$)$_2$}$_4$ in 150 ml of chlorobenzene is transferred into a 2-liter Parr reactor under nitrogen. The reactor is heated to 65° C. and the solution is stirred by a mechanical stirrer at this temperature. The reactor is pressurized with ethylene to 100 kPa and the polymerization was continued for 10 hours. The reaction is depressurized from ethylene by venting and the reaction is quenched after 10 hours in a manner similar to Example 1 and the product is isolated. It is possible to produce product varying in viscosity from 2 to greater 500 cSt by changing the catalyst, polymerization temperature, ethylene pressure or a combination thereof.

Example 30

Another typical polymerization example employing catalyst selected from formulas 5–12 is done as follows: A solution of 100 mg (0.068 mmol) of Pd-α-diimine complex [2,6-($^i$Pr)$_2$C$_6$H$_3$N=C(Me)—C(Me)=NC$_6$H$_3$2,6-($^i$Pr)$_2$Pd(Me)(OEt$_2$)]B{3,5C$_6$H$_3$(CF$_3$)$_2$}$_4$ in 150 ml of chlorobenzene is transferred into a 2-liter Parr reactor under nitrogen. The reactor is heated to 65° C. and the solution is stirred by a mechanical stirrer at this temperature. The reactor is pressurized with ethylene to 100 kPa and the polymerization was continued for 10 hours. The reaction is depressurized from ethylene by venting and the reaction is quenched after 10 hours in a manner similar to Example 1 and the product is isolated. It is possible to produce product varying in viscosity from 2 to greater 500 cSt by changing the catalyst, polymerization temperature, ethylene pressure or a combination thereof.

Example 31

Another typical polymerization example employing catalyst selected from formulas 5–12 is done as follows: A solution of 100 mg (0.071 mmol) of Ni-α-diimine complex [2,6-($^i$Pr)$_2$C$_6$H$_3$N=C(Me)—C(Me)=NC$_6$H$_3$2,6-($^i$Pr)$_2$Ni(Me)(OEt$_2$)]B{3,5-C$_6$H$_3$(CF$_3$)$_2$}$_4$ in 150 ml of chlorobenzene is transferred into a 2-liter Parr reactor under nitrogen. The reactor is heated to 65° C. and the solution is stirred by a mechanical stirrer at this temperature. The reactor is pressurized with ethylene to 100 kPa and the polymerization was continued for 10 hours. The reaction is depressurized from ethylene by venting and the reaction is quenched after 10 hours in a manner similar to Example 1 and the product is isolated. It is possible to produce product varying in viscosity from 2 to greater 500 cSt by changing the catalyst, polymerization temperature, ethylene pressure or a combination thereof.

Example 32

Another typical polymerization example employing catalyst selected from formulas 5–12 is done as follows: A solution of 100 mg (0.072 mmol) of Ni-α-diimine complex [2,6-($^i$Pr)$_2$C$_6$H$_3$N=C(H)—C(H)=NC$_6$H$_3$2,6-($^i$Pr)$_2$Ni(Me)(OEt$_2$)]B{3,5-C$_6$H$_3$(CF$_3$)$_2$}$_4$ in 150 ml of chlorobenzene is transferred into a 2-liter Parr reactor under nitrogen. The reactor is heated to 65° C. and the solution is stirred by a mechanical stirrer at this temperature. The reactor is pressurized with ethylene to 100 kPa and the polymerization is continued for 10 hours. The reaction is depressurized from ethylene by venting and the reaction is quenched after 10 hours in a manner similar to Example 1 and the product is isolated. It is possible to produce product varying in viscosity from 2 to greater 500 cSt by changing the catalyst, polymerization temperature, ethylene pressure or a combination thereof.

From the above description, it is apparent that the objects of the present invention have been achieved. While only certain embodiments have been set forth, alternative embodiments and various modifications will be apparent from the above description to those skilled in the art. These and other alternatives are considered equivalents and are within the spirit and scope of the present invention.

That which is claimed is:

1. A process for the selective production of an oligomer oil comprising less than 25% oligomers that contain two or fewer monomeric units, at least 65% of oligomers that contain three monomeric units, and less than 15% of oligomers that contain four or more monomeric units comprising:

(a) polymerizing a feed comprising one or more linear C$_4$ to C$_{20}$ monomeric 1-olefins having at least one hydrogen on the 2-carbon atom, at least two hydrogens on the 3-carbon atom and at least one hydrogen on the 4-carbon atom in the presence of a catalyst system comprising a bulky ligand transition metal complex of the stoichiometric Formula 1 and an activating quantity of an activator comprising an organoaluminum compound or a hydrocarbylboron compound or a mixture thereof:

$$L_mMX_nX'_p \qquad \text{Formula 1}$$

wherein L is the bulky ligand, M is the transition metal, X and X' may be the same or different and are independently selected from the group consisting of halogen, hydrocarbyl group and hydrocarboxyl group having 1–20 carbon atoms, wherein m is 1–3, n is 0–3, and p is 0–3 and the sum of the integers m+n+p corresponds to the transition metal valency, under reaction conditions such that there is formed a product mixture comprising an essentially terminally unsaturated viscous, essentially 1-olefin-containing poly (1-olefin) or copoly (1-olefin) of molecular weight between about 300 and about 10,000 that exhibits a terminal vinylidene content of more than 80%; and (b) oligomerizing at least a relatively lower molecular weight oligomeric fraction of the product mixture formed in step (a), the oligomeric mixture comprising oligomers having two monomeric units from the aforesaid monomeric 1-olefins fed to step (a), in the presence of an acidic oligomerization catalyst under reaction conditions such that there is formed a resulting product mixture comprising less than 25% by weight of oligomers that contain two or fewer monomeric units, at least 65% by weight of oligomers that contain three monomeric units, and less than 15% by weight of oligomers having four or more monomeric units.

2. The process of claim 1 wherein the aforesaid bulky ligand transition metal complex contains a multiplicity of bonded atoms forming a group which optionally is cyclic with one or more optional heteroatoms.

3. The process of claim 1 wherein the aforesaid poly(1-olefin) or copoly(1-olefin) exhibits a terminal unsaturation of more than 90%.

4. The process of claim 1 wherein the metallocene is represented by the stoichiometric Formula 2

$$(Cp)_mMR^1_nR^2_p \qquad \text{Formula 2}$$

wherein each Cp is a substituted or unsubstituted cyclopentadienyl or indenyl ring, each such substituent thereon can be the same or different and is an alkyl, alkenyl, aryl, alkaryl, or aralkyl radical having from 1 to 20 carbon atoms or at least two carbon atoms formed together to form a part of a C$_4$ or C$_6$ ring; wherein M is a Group IV, V or VI transition metal; wherein R$^1$ and R$^2$ are independently selected from the group consisting of halogen, hydrocarbyl, and hydrocarboxyl, each having 1–20 carbon atoms; and wherein m is 1–3, n is 0–3, and p is 0–3, and the sum of m+n+p corresponds to the oxidation state of M.

5. The process of claim 4 wherein the metallocene is represented by the Formulas 3 or 4

$$(C_5R^3_g)_kR^4_s(C_5R^3_g)MQ_{3-k-x} \qquad \text{Formula 3}$$

or $$R^4_s(C_5R^3_g)_2MQ^1 \qquad \text{Formula 4}$$

wherein each C$_5$R$^3{}_g$ is a substituted or unsubstituted cyclopentadienyl and each R$^3$ may be the same or different and is hydrogen, alkyl, alkenyl, alkaryl, aryl, or aralkyl having from 1 to 20 carbon atoms or at least 2 carbon atoms joined together to form a part of a $C_4$ to $C_6$ ring; wherein $R^4$ is either 1) an alkylene radical containing from 1 to 4 carbon atoms, or 2) a dialkyl germanium or silicon or an alkyl phosphoric or amine radical and $R^4$ is substituting on and bridging two $C_5R^3_g$ rings or bridging one $C_5R^3_g$ ring back to M; wherein each Q can be the same or different and is an alkyl, alkenyl, aryl, alkaryl, or arylalkyl radical having from 1 to 20 carbon atoms or halogen, and Q' is an alkylidene radical having from 1 to 20 carbon atoms; when k is 0, x is 1, otherwise x is always 0; and wherein s is 0 or 1; and when s is 0, g is 5 and k is 0, 1 or 2; and when s is 1, g is 4 and k is 1.

6. The process of claim 5 wherein each $C_5R^3_g$ is a mono-substituted cyclopentadienyl of type $C_5H_4R^4$ and each $R^3$ may be the same or different primary or secondary alkyl radical.

7. The process of claim 6 wherein $R^3$ is a primary alkyl group.

8. The process of claim 6 wherein $R^3$ is a secondary alkyl group.

9. The process of claim 1 wherein step (a) is conducted at a temperature range of 25–150° C.

10. The process of claim 9 wherein the product of step (a) is a low viscosity oil having a viscosity in the range of 2–20 cSt at 100° C.

11. The process of claim 5 wherein each $C_5R^3_g$ is a di, tri, or tetra-substituted cyclopentadienyl of type $C_5H_3R^3_2$, $C_5H_2R^3_3$, $C_5HR^3_4$ and each $R^3$ may be the same or different primary or secondary alkyl radical.

12. The process of claim 11 wherein $R^3$ is a methyl radical.

13. The process of claim 11 wherein the polymerization of step (a) is conducted at a temperature of 25–150° C.

14. The process of claim 1 wherein the product of step (a) is high viscosity oil having a viscosity in the range of 20–5,000 cSt at 100° C.

15. The process of claim 5 wherein the metal in the aforesaid bulky ligand transition metal complex is a metal of Periodic Group IVB.

16. The process of claim 2 wherein the aforesaid bulky ligand transition metal complex has a stoichiometric formula of

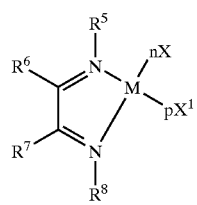

Formula 5

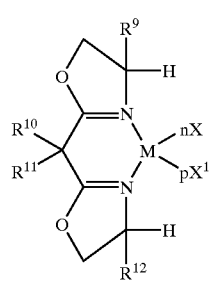

Formula 6

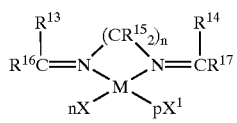

Formula 7 or

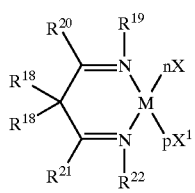

Formula 8 wherein
M is selected from the group consisting of Ti, Zr, Sc, V, Cr, a rare earth metal, Fe, Co, Ni, or Pd;
X and $X^1$ are independently selected from the group consisting of halogen, hydrocarbyl group and hydrocarboxyl group having 1 to 20 carbon atoms;
n and p are integers whose sum is the valency of M minus 2;
$R^5$ and $R^8$ are each independently hydrocarbyl or substituted hydrocarbyl, provided that the carbon atom bound to the imino nitrogen atom has at least two carbon atoms bound to it;
$R^6$ and $R^7$ are each independently hydrogen, hydrocarbyl, substituted hydrocarbyl, or $R^6$ and $R^7$ taken together are hydrocarbylene or substituted hydrocarbylene to form a carbocyclic ring;
$R^9$ and $R^{12}$ are each independently hydrogen, hydrocarbyl or substituted hydrocarbyl;
$R^{10}$ and $R^{11}$ are each independently hydrogen, hydrocarbyl or substituted hydrocarbyl;
each $R^{15}$ is independently hydrogen, hydrocarbyl or substituted hydrocarbyl, or two of $R^{15}$ taken together form a ring;
$R^{16}$ is hydrocarbyl or substituted hydrocarbyl, and $R^{13}$ is hydrogen, hydrocarbyl or substituted hydrocarbyl or $R^{16}$ and $R^{13}$ taken together form a ring;
$R^{17}$ is hydrocarbyl or substituted hydrocarbyl, and $R^{14}$ is hydrogen, hydrocarbyl or substituted hydrocarbyl, or $R^{17}$ and $R^{14}$ taken together form a ring;
each $R^{18}$ is independently hydrogen, hydrocarbyl or substituted hydrocarbyl;
$R^{19}$ and $R^{22}$ are each independently hydrocarbyl or substituted hydrocarbyl, provided that the carbon atom bound to the imino nitrogen atom has at least two carbon atoms bound to it;
$R^{20}$ and $R^{21}$ are each independently hydrogen, hydrocarbyl, or substituted hydrocarbyl;
each $R^{23}$ is independently hydrocarbyl or substituted hydrocarbyl provided that any olefinic bond in said olefin is separated from any other olefinic bond or aromatic ring by a quaternary carbon atom or at least two saturated carbon atoms;
n in Formula 7 is 2 or 3;
and provided that:
when complex has the structure of stoichiometric Formula 7, M is not Pd; and
when M is Pd, a diene is not present.

17. The process as recited in claim 16 wherein said transition metal is Co, Fe, Ni, or Pd.

18. The process as recited in claim 16 wherein said transition metal is Ni or Pd.

19. The process as recited in claim 16, wherein said bulky ligand transition metal complex has the structure of Formula 8.

20. The process of claim 2 wherein the aforesaid bulky ligand transition metal complex is a complex of stoichiometric Formula 9;

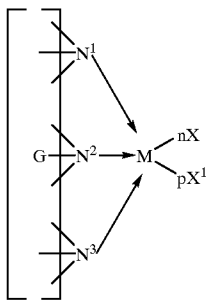

Formula 9 wherein three nitrogen atoms $N^1$, $N^2$ and $N^3$, are coordinately bonded to transition metal M selected from Co, Fe, Ru and Mn; wherein G comprises one or more organic moieties to which the three nitrogen atoms $N^1$, $N^2$ and $N^3$, are collectively or separately bonded; wherein X and $X^1$ are independently selected from the group consisting of halogen, hydrocarbyl group and hydrocarboxyl group having 1 to 20 carbon atoms; wherein n and p are integers whose sum is the valency of M minus 3; and wherein when M is Co, the sum of n and p is 1, 2, or 3, when M is Ru, the sum of n and p is 2, 3, or 4, when M is Fe, the sum of n and p is 2 or 3, and when M is Mn, the sum of n and p is 1, 2, 3 or 4.

21. The process of claim 20 wherein the aforesaid bulky ligand transition metal complex has the structure of Formula 10;

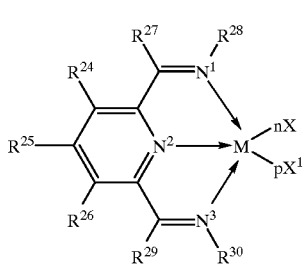

Formula 10 wherein M is Fe[II], Fe[III], Co[II], Co[II], Co[III], Ru [II], Ru[IV], Mn[I], Mn[II], Mn[III] or Mn[IV]; wherein X and X are independently selected from the group consisting of halogen, hydrocarbyl group and hydrocarboxyl group having 1 to 20 carbon atoms; wherein n and p are integers whose sum is the valency of M; $R^{24}$, $R^{25}$, $R^{26}$, $R^{27}$, and $R^{29}$ are independently selected from hydrogen, halogen, hydrocarbyl, substituted hydrocarbyl, heterohydrocarbyl or substituted heterohydrocarbyl, and wherein (1) when M is Fe, Co or Ru, $R^{28}$ and $R^{30}$ are independently selected from hydrogen, halogen, hydrocarbyl, substituted hydrocarbyl, heterohydrocarbyl and substituted heterohydrocarbyl; and when any two or more of $R^{24}$–$R^{30}$ are hydrocarbyl, substituted hydrocarbyl, heterohydrocarbyl and substituted heterohydrocarbyl, said two or more can be linked to form one or more cyclic substituents, or (2) when M is Fe, Co, Mn or Ru, then $R^{28}$ is represented by the stoichiometric Formula 11 and $R^{30}$ is represented by the stoichiometric Formula 12 as follows:

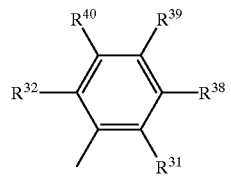

Formula 11

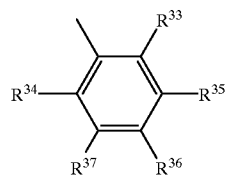

Formula 12 wherein $R^{31}$ to $R^{40}$ are independently selected from hydrogen, halogen, hydrocarbyl, substituted hydrocarbyl, heterohydrocarbyl or substituted heterohydrocarbyl; wherein when any two or more of $R^{24}$ to $R^{27}$, $R^{29}$ and $R^{31}$ to $R^{40}$ are hydrocarbyl, substituted hydrocarbyl, heterohydrocarbyl or substituted heterohydrocarbyl, said two or more can be linked to form one or more cyclic substituents; with the proviso that at least one of $R^{31}$, $R^{32}$, $R^{33}$ and $R^{34}$ is hydrocarbyl, substituted hydrocarbyl, heterohydrocarbyl or substituted heterohydrocarbyl when neither of the ring systems of Formulas 11 or 12 forms part of a polyaromatic fused-ring system, or (3) when M is Fe, Co, Mn or Ru, then $R^{28}$ is a group having the formula —$NR^{41}R^{42}$, and $R^{30}$ is a group having the formula —$NR^{43}R^{44}$, wherein $R^{41}$ to $R^{44}$ are independently selected from hydrogen, halogen, hydrocarbyl, substituted hydrocarbyl, heterohydrocarbyl or substituted heterohydrocarbyl; wherein when any two or more of $R^{24}$ to $R^{27}$, $R^{29}$ and $R^{41}$ to $R^{44}$ are hydrocarbyl, substituted hydrocarbyl, heterohydrocarbyl or substituted heterohydrocarbyl, such two or more can be linked to form one or more cyclic substituents.

22. The process of claim 1 wherein step (a) is conducted under low hydrogen partial pressures.

23. The process of claim 22 wherein the partial pressure of hydrogen in step (a) is 100 psig or less.

24. The process of claim 23 wherein the partial pressure of hydrogen in step (a) is 50 psig or less.

25. The process of claim 1 wherein the oligomerization catalyst comprises boron trifluoride and a promoter.

26. The process of claim 1 wherein a fraction comprising the monomeric and dimeric components of the product of step (a) are separated therefrom and oligomerized in step (b).

27. The process of claim 1 wherein a fraction comprising the dimeric components and a portion of the trimeric components with or without monomeric components of the product mixture from step (a) are separated therefrom and oligomerized in step (b).

28. The process of claim 1 wherein an admixture of the aforesaid relatively lower molecular weight fraction and one or more vinyl olefin containing from 4 to 20 carbon atoms is oligomerized in step (b).

29. The process of claim 1 wherein the entire product from step (a) is oligomerized in step (b).

30. The process of claim 28 wherein 1-decene is polymerized in step (a), and an admixture of the relatively lower molecular weight fraction containing 20 carbon atoms or fewer and the aforesaid one or more vinyl olefin is oligomerized in step (b).

31. The process of claim 30 wherein the aforesaid vinyl olefin in the admixture is 1-dodecene or 1-tetradecene.

32. The process claim 1 wherein the product mixture from step (b) comprises at least 70% by weight of oligomers that contain three monomeric units.

33. The process of claim 32 wherein the product mixture from step (b) compromises at least 80% of oligomers that contain three monomeric units.

34. The process of claim 1 wherein the product mixture from step (b) comprises less than 15% of oligomers that contain one or two monomeric units.

35. The process of claim 1 wherein the product of step (b) comprises less than 10 percent by weight of oligomers having 4 or more monomeric units.

* * * * *

UNITED STATES PATENT AND TRADEMARK OFFICE
CERTIFICATE OF CORRECTION

PATENT NO.    : 6,548,724 B2
DATED         : April 15, 2003
INVENTOR(S)   : Vahid Bagheri et al.

It is certified that error appears in the above-identified patent and that said Letters Patent is hereby corrected as shown below:

Column 5,
Line 49, reads "may be the same or different and primary or" should read -- may be the same or different and is a primary or --

Column 6,
Lines 47-48, reads "substituted hdrocarbyl or $R^{16}$ and $R^3$ taken together" shoud read -- substituted hydrocarbyl or $R^{16}$ and $R^{13}$ taken together --

Column 8,
Line 61, reads "$[R^{51} AlO]_s$" should read -- $[R^{51} AIO]_s$ --
Line 62, reads "formula $R^{52} (R^{53} AlO)_s$" should read -- formula $R^{52} (R^{53} AIO)_s$ --

Column 15,
Line 37, reads "and less than 5500 at -400ºC," shoud read -- and less than 5500 cSt at -40ºC, --

Column 21,
Line 12, reads "resulted in isolation of 107.2 g of a clear fluid." should read -- resulted in isolation of 197.2 g of a clear fluid. --

Column 24,
Line 43, reads "69% 032" should read -- 69% C32 --

Column 31,
Line 51, reads "M is Fe[II], Fe[III], Co[II], Co[II], ............." should read -- M is Fe[II], Fe[III], Co[I], Co[II], ......................... --
Lines 52-53, reads "; wherein X and X are independently selected" should read -- ; wherein X and $\mathbf{X^1}$ are independently selected --

Signed and Sealed this

Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,548,724 B2  Page 1 of 1
APPLICATION NO. : 09/814501
DATED           : April 15, 2003
INVENTOR(S)     : Vahid Bagheri et al.

It is certified that error appears in the above-identified patent and that said Letters Patent is hereby corrected as shown below:

| Col. | Line | |
|---|---|---|
| 6 | 55-60 | *Original & Patent read:* "; each $R^{23}$ is independently hydrocarbyl or substituted hydrocarbyl provided that any olefinic bond in said olefin is separated from any other olefinic bond or aromatic ring by a quaternary carbon atom or at least two saturated carbon atoms" |
| | | Segment should be deleted from patent specification. |
| 30 | 54-58 | *Orginal & Patent read:* "; each $R^{23}$ is independently hydrocarbyl or substituted hydrocarbyl provided that any olefinic bond in said olefin is separated from any other olefinic bond or aromatic ring by a quaternary carbon atom or at least two saturated carbon atoms" |
| | | Segment should be deleted from patent specification. |

Signed and Sealed this

Second Day of October, 2007

JON W. DUDAS
*Director of the United States Patent and Trademark Office*